(12) United States Patent
Yang et al.

(10) Patent No.: US 6,337,941 B1
(45) Date of Patent: Jan. 8, 2002

(54) SPLITTABLE OPTICAL FIBER RIBBONS

(75) Inventors: Houching Michael Yang, Conover; Justin Thompson, Huntersville, both of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/408,079

(22) Filed: Sep. 29, 1999

(51) Int. Cl.[7] .................................................. G02B 6/44
(52) U.S. Cl. ........................ 385/114; 385/100; 385/128
(58) Field of Search ........................ 385/100–114, 127, 385/128, 141

(56) References Cited

U.S. PATENT DOCUMENTS

| | | | |
|---|---|---|---|
| 2,628,998 A | 2/1953 | Frisbie | 385/114 |
| 4,467,138 A | 8/1984 | Brorein | 174/115 |
| 4,729,628 A | 3/1988 | Kraft et al. | 385/114 |
| 4,815,814 A | 3/1989 | Ulijasz | 385/114 |
| 5,180,890 A | 1/1993 | Pendergrass et al. | 385/103 |
| 5,259,050 A | 11/1993 | Yamakawa et al. | 385/59 |
| 5,442,722 A | 8/1995 | DeCarlo | 385/114 |
| 5,485,539 A | 1/1996 | Mills | 385/114 |
| 5,598,498 A | 1/1997 | Comezzi | 385/114 |
| 5,602,953 A | 2/1997 | Delage et al. | 385/101 |
| 5,717,805 A | 2/1998 | Stulpin | 385/114 |
| 5,737,470 A | 4/1998 | Nagano et al. | 385/114 |
| 5,809,195 A | 9/1998 | Brown et al. | 385/114 |
| 5,905,835 A | 5/1999 | Bourghelle et al. | 385/114 |
| 6,175,677 B1 * | 1/2001 | Yang et al. | 385/114 |

FOREIGN PATENT DOCUMENTS

| | | | |
|---|---|---|---|
| EP | 0 843 187 A1 | 5/1998 | |
| FR | 2 735 272 | 12/1996 | |
| JP | 9-243884 | * 9/1997 | 385/114 |
| WO | WO99/28777 | 6/1999 | |

OTHER PUBLICATIONS

Generic Requirements for Optical Fiber and Optical Fiber Cable, Issue 2, Jul. 1998 "Generic Requirements GR–20–CORE".

* cited by examiner

Primary Examiner—Huy Mai
(74) Attorney, Agent, or Firm—Sughrue Mion, PLLC

(57) ABSTRACT

A splittable double-embedded optical fiber ribbon, which includes a plurality of sub-unit ribbons, encapsulated within an outer encapsulation layer. At least two of the sub-units include complementary edges which are shaped so that, when adjacent one another, they enhance the stability of the interface between those sub-units. The enhanced stability of the sub-unit interface improves the planarity of the double-embedded optical fiber ribbon of which they are a part.

28 Claims, 5 Drawing Sheets

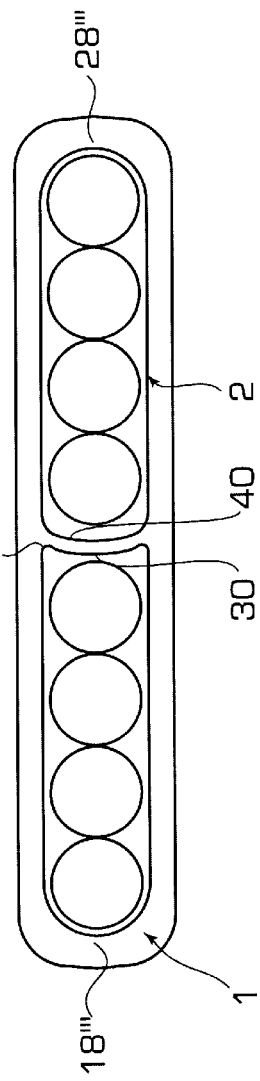
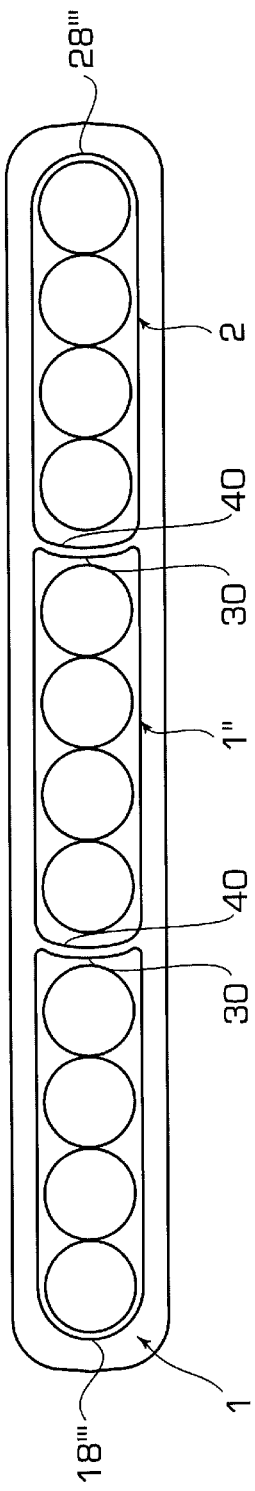
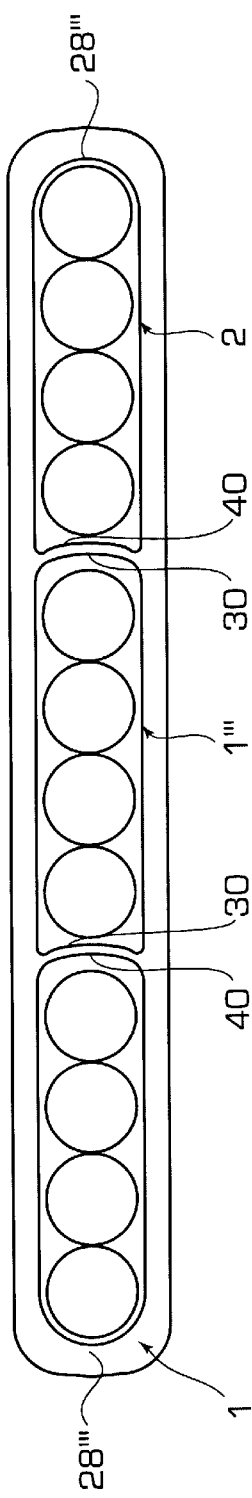

SPLITTABLE OPTICAL FIBER RIBBONS

BACKGROUND

1. Field of the Invention

The present invention relates to splittable optical fiber ribbons and, in particular, optical fiber ribbons for telecommunications cables. More particularly, the present invention is directed to the interface between adjacent sub-unit ribbons within splittable double-embedded optical fiber ribbons.

2. Related Art

Related-art double-embedded optical fiber ribbons are designed with sub-unit having rounded edges. Each sub-unit is formed of a plurality of optical fibers disposed in a plane and encapsulated with a polymer thereby forming the sub-unit. Each sub-unit includes rounded edges, which are placed adjacent one another, when the sub-units are arranged side-by-side so that the optical fibers of all the sub-units lie substantially in a plane. The sub-units are then encapsulated by a second polymer coat to form one optical fiber ribbon therefrom.

A related-art sub-unit design, and ribbon made therefrom, are shown in FIG. 1. A first sub-unit 1' includes optical fibers 3' encapsulated within a matrix material 4'. Similarly, a second sub-unit 2' includes optical fibers 3' encapsulated within a matrix material 4'. Both of the first and second sub-units 1' and 2' have rounded edges.

In the related-art design, however, alignment of the sub-units so that all the optical fibers remain in a plane as the second polymer coat cures is a problem, i.e., planarity of the ribbon formed by the sub-units is poor. The sub-units 1' and 2' include rounded edges that contact one another generally at a point 6', i.e., as two half circles would contact. Because of the point contact, the sub-units 1' and 2' tend to rotate relative to one another about the contact point which thereby causes poor ribbon planarity. Yet good ribbon planarity is an important ribbon property. Ribbon planarity is a measure of optical fiber alignment in a ribbon and is a measure of ribbon quality. The ribbon planarity plays an important part in fusion and mechanical multi-fiber splicing, as well as in termination in the field. Ribbon planarity is measured according to industry standards wherein a planarity of zero indicates that all fibers in the ribbon lie in the same plane. Therefore, it is desirable to achieve a ribbon planarity which is as low as possible.

FIG. 1 shows a ribbon having poor—i.e., high—planarity. The rotation of the two sub-unit ribbons is due, at least in part, to the surface tension effects occurring in the second matrix material as it is cured between or among sub-unit ribbons during the curing process. In addition, rotation of the sub-unit ribbons may be due to the fact that different ribbon sub-units may be under different pay-off and take-up tensions during the ribbonizing process. Thirdly, the sub-unit ribbons may have electrostatic forces and may be under vibration during ribbon processing due to the instability of the equipment. These factors may lead to—due to the point-contact between sub- units—a higher or inconsistent ribbon planarity. For instance, the planarity may be greater than 50 $\mu$m, which is too large for certain specifications—US GR-20-CORE, issue 2, Italy's Telecom Italia, and Swedish Telia, for example—depending on the fiber count in the ribbon.

The ribbon sub-units include a minimum of two fibers and can include up to 12-fibers per sub-unit. A ribbon includes of a minimum of two ribbon sub-units and each sub-unit may include a different number of optical fibers. For example, a ribbon may have three sub-units, wherein each sub-unit may include either 2, or 4, or 6, or 8, or 12, or any other number of, optical fibers.

SUMMARY OF THE INVENTION

An object of the present invention is to overcome the problems of the related art. A further object of the present invention is to alleviate, or at the very least, minimize the related-art problem of poor—i.e., high—planarity in double-embedded optical fiber ribbons formed from sub-unit ribbons.

Planarity in a double-embedded optical fiber ribbon is improved—i.e., lowered—in the present invention, by enhancing the stability of the interface between the sub-unit ribbons from which the double-embedded optical fiber ribbon is made. The present invention enhances interface stability by shaping the sub-unit-ribbon edges so as to create an interlocking effect and a greater contact area between the sub-units. The interlocking effect and greater contact area reduce sub-unit-ribbon interfacial micro-movement during formation of the double-embedded optical fiber ribbon.

Interface stability may be enhanced by making the sub-unit ribbon edges of a complementary shape so as to create an interlocking effect. For example, the edges may be complimentarily shaped by inclusion of a non-circular surface on one edge of each sub-unit. The non-circular surfaces, when adjacent one another, reduce rotation or rolling motion of the sub-units about the interface, i.e., the non-circular surfaces tend to interlock the sub-unit ribbons. The edges of the sub-units, opposite those edges which include a non-circular surface, may be either rounded or may also include a non-circular surface.

A sub-unit ribbon wherein both edges include a non-circular surface is advantageous when producing a double-embedded optical fiber ribbon of more than two sub-units. That is, the double-embedded optical fiber ribbon may be made of any number of sub-units so that it includes the desired number of optical fibers. A sub-unit having only one edge that includes a non-circular surface is advantageously disposed on the edges of the double-embedded optical fiber ribbon. That is, a sub-unit having one rounded edge and one edge that includes a non-circular surface can be arranged so that its rounded edge is disposed toward the outer edge of the double-embedded optical fiber, whereas the edge having a non-circular surface is disposed adjacent another sub-unit's non-circular surface.

The non-circular surfaces may be included in variously shaped sub-unit edges, all of which enhance the stability of the interface between the sub-units by resisting relative rotation. The non-circular surfaces may be substantially perpendicular to the plane in which the sub-unit's optical fibers lie. Alternatively, the non-circular surface may be oblique to the plane in which the sub-unit's optical fibers lie. Further still, the non-circular surfaces may include protrusions extending therefrom. Not only do sub-units that have a non-circular surface on their edges enhance resistance to rotation, they are also complementarily shaped so as to provide an increased contact area between the sub-unit edges.

Instead of having edges with circular surfaces that point-contact one another, the stability of the interface between sub-units can be increased using rounded edges that have an increased contact area therebetween. That is, one sub-unit may have an edge with a concave circular surface, whereas an adjacent sub-unit may then have a convex circular surface which fits within the concave circular surface. Thus, instead of contacting at a point as do the circular or rounded edges in the related art, the circular or rounded edges of the present invention sub-units contact one another over a large portion of their complementarily rounded edges.

With each of the edge configurations of the present invention, the sub-units may be separated by the second matrix material, or may directly abut one another.

Not only do the above mentioned edge shapes provide an interlocking effect, they also provide a greater contact area between the sub-units, thereby further enhancing stability of the sub-unit interface. When the sub-units are separated by the second matrix material, a greater opposing surface area for limiting sub-unit rotation is achieved by the above-mentioned edge shapes. Further, when the sub-units are directly abutted, without any of the second matrix material therebetween, they are even less likely to rotate relative to one another.

Further, when there is no second polymer coat between the sub-units, not only is planarity improved—i.e., lowered—and less second matrix material required but, also, the sub-units are more easily separated. That is, split-ability of the ribbon is enhanced because the sub-units are allowed to slide relative to one another along their contact interface when a splitting force is applied in a direction parallel to the contact surface. Although split-ability is enhanced, the sub-units still provide an increased resistance to relative rotation because the contact interface is less susceptible to surface tension forces arising from the outer matrix material during the curing process, and is less susceptible to other factors which cause relative rotation.

The sub-unit ribbons may be formed using any known method. In one method, for example, individual optical fibers are aligned in a common plane and fed through a die in which a matrix material is applied to form the sub-unit ribbon structure. The material for the matrix material in each sub-unit ribbon may be any of the conventionally used matrix materials. One well-known matrix material used for optical fiber ribbons is a polyurethane acrylate resin. Such a resin material may be ultraviolet (UV) curable, so that after the optical fibers pass through a die and resin material is applied to form the matrix material over the optical fibers, each entire sub-unit structure is passed through a UV light source for curing the resin. It has been found that such a sub-unit ribbon structure provides for secure retention of individual optical fibers therein due to the properties of the matrix material itself, as well as due to a strong and durable bond between the matrix material and the optical fibers. More specifically, the matrix material is selected from a group of materials which is strong, elastic, flexible, resistant to heat and other elements, etc. For example, the matrix material may be a UV curable polyurethane acrylate resin as mentioned above, and as manufactured by DSM Desotech inc., Elgin, Ill., USA. Alternatively, other commercially available resin materials such as DSM 900 series or BORDEN 100 series, for example, may be used as the matrix material, as is known to those skilled in the art. Additionally, thermoplastic materials such as polypropylene or polyamide, or copolymers, for example, may be used as the matrix material. As is known to those skilled in the art, once the thermoplastic material is applied as the matrix material in a molten state, it is solidified by the removal of heat.

Further, the second matrix material of the double-embedded optical fiber ribbon may be any of the conventionally used matrix materials and may be the same as, or different from, the material used for the matrix material in the sub-unit ribbons.

Although the sub-unit ribbons may be made by any known method, the present invention contemplates a specially shaped die for making multiple sub-unit ribbons at one time, which sub-units are already properly aligned for encapsulation by a second matrix material. That is, it is preferable to make the sub-units and form them into a double-embedded optical fiber ribbon in a one-step process.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein:

FIG. 7 is a schematic cross-section of a double-embedded optical fiber ribbon according to a fourth embodiment of the present invention;

FIG. 8 is a schematic cross-section of a modified version of the sub-units in the double-embedded optical fiber ribbon according to the fourth embodiment of the present invention;

FIG. 9 is a schematic cross-section of a modified version of the sub-units in the double-embedded optical fiber ribbon according to the fourth embodiment of the present invention;

FIG. 11A is a schematic cross-section of a die-half for producing sub-unit ribbons of one embodiment according to the present invention, whereas FIG. 12A is a schematic cross-section of a die-half for producing sub-unit ribbons of another embodiment according to the present invention, whereas

DETAILED DESCRIPTION OF THE INVENTION

Figure 1:
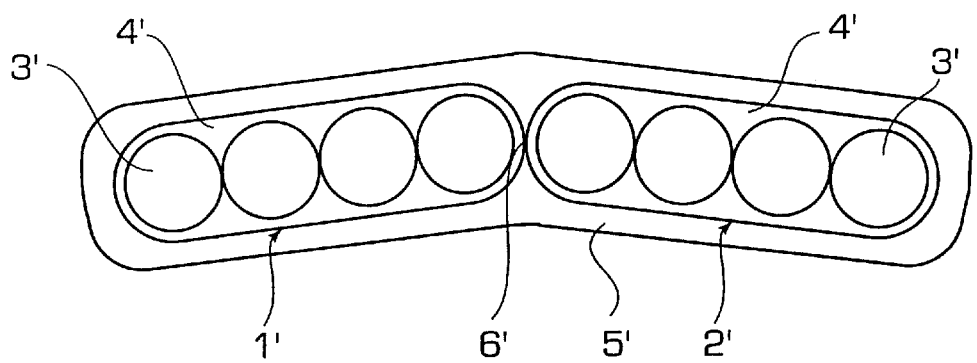
FIG. 1 is schematic cross-section of a double-embedded optical fiber ribbon having poor planarity, according to the related art.

The present invention is directed to improving—i.e., reducing—the planarity of a double-embedded optical fiber ribbon by enhancing the stability of the interface between the edges of sub-unit ribbons which make up the double-embedded optical fiber ribbon. Stability is enhanced by shaping the edges of the sub-unit ribbons so that they have an interlocking effect, and so that they also have an increased contact area therebetween. Various non-limiting embodiments of a double-embedded optical fiber ribbon having improved—i.e., reduced—planarity—due to the enhanced stability of the sub-unit ribbon interface—will now be described. Throughout the figures similar reference numerals are used to denote similar elements of the invention. Further, for convenience of reference, the terms top, bottom, right, left, inner, and outer are used in connection with the orientation of the double-embedded optical fiber ribbons shown in the figures. Of course, the double-embedded optical fiber ribbons may be oriented in a manner different from that shown in the figures.

Figure 2:
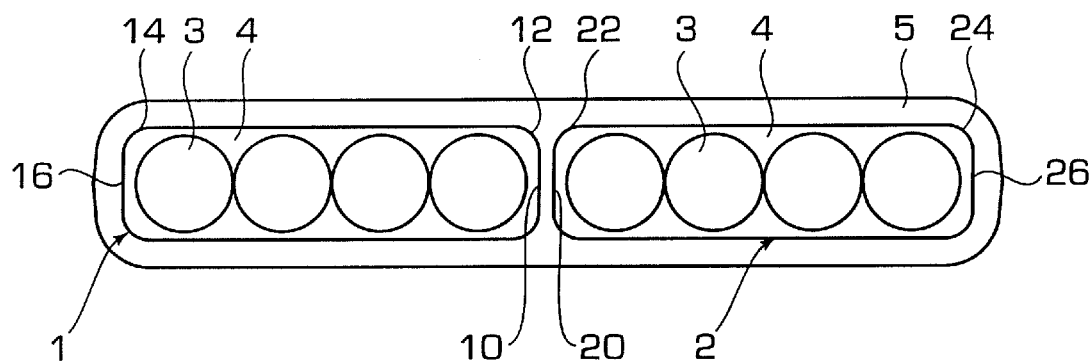
FIG. 2 is a schematic cross-section of a double-embedded optical fiber ribbon according to a first embodiment of the present invention.
Figure 3:
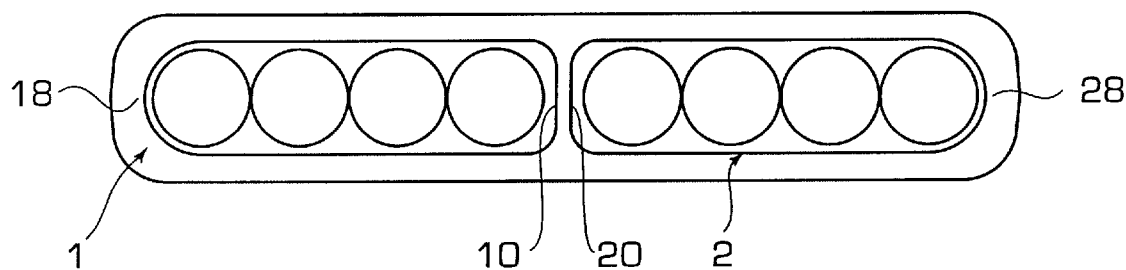
FIG. 3 is a schematic cross-section of a modified version of the sub-units in the double-embedded optical fiber ribbon according to the first embodiment of the present invention.

A first embodiment of a double-embedded optical fiber ribbon is shown in FIGS. 2 and 3, and will now be described. The double-embedded optical fiber ribbon includes a first sub-unit ribbon 1 and a second sub-unit ribbon 2 which are disposed adjacent one another and are encapsulated in matrix material 5 which is also called an outer encapsulation layer.

Each of the first and second sub-unit ribbons 1, 2 includes a plurality of optical fibers 3 which are arranged in a plane and then embedded in a matrix material 4. The first sub-unit ribbon 1 includes a first edge on which flat surface 10 is disposed, and a second edge on which a second flat surface 16 is disposed. Similarly, the second sub-unit ribbon 2 includes a first edge on which flat surface 20 is disposed, and a second edge on which a second flat surface 26 is disposed. The flat surfaces 10, 20, 16, 26 are substantially perpendicular to the plane in which the optical fibers 3 lie. Additionally, the first sub-unit ribbon 1 includes transition regions 12 extending from the flat surface 10 to the top and bottom surfaces of the sub-unit 1, as well as includes transition regions 14 extending from the flat surface 26 to the sub-unit top and bottom surfaces. Similarly, the second sub-unit ribbon 2 includes transition regions 22 extending from the flat surface 20 to the top and bottom of the sub-unit 2, as well as includes transition regions 24 extending from the flat surface 26 to the sub-unit top and bottom surfaces. Although the transition regions 12, 14, 22, 24 are shown as rounded, they may be of any other suitable shape.

The first and second sub-unit ribbons 1, 2 are disposed adjacent one another so that the flat surface 10 faces the flat surface 20. The first and second sub-unit ribbons 1, 2 are then encapsulated by a second matrix material 5. The sub-unit ribbons 1, 2 may be disposed so that second matrix material 5 is disposed between the flat surfaces 10, 20 or, alternatively, may be disposed so that the flat surface 10 abuts the flat surface 20. With both arrangements, the sub-units are less likely to rotate relative to one another, thereby improving planarity, due to the interaction of flat surfaces 10 and 20. In the latter arrangement, the sub-unit ribbons are less likely to shift relative to one another—in a direction parallel to the flat surfaces 10, 20—during production because of the direct contact. Yet after the second matrix material 5 is cured, the directly abutting sub-units are more easily split from the double-embedded optical fiber ribbon because they can shift along their directly abutting surfaces.

FIG. 3 shows an alternative version of the outer edges of the sub-units shown in FIG. 2. In FIG. 3, the first and second sub-unit ribbons 1, 2 are the same as in FIG. 2, except the second—outer—edges are rounded, as at 18 and 28, respectively, instead of having flat surfaces 16, 26. The rounded outer edges 18, 28 are useful in a double-embedded optical fiber ribbon which includes two sub-units. Because of the rounded outer edges 18, 28, less matrix material 5 is required to encapsulate the sub-units 1, 2 and still provide smoothly rounded edges for the double-embedded optical fiber ribbon. In contrast, sub-units having outer edges with flat surfaces 16, 26 are preferred for forming a double-embedded optical fiber ribbon that includes more than two sub-units. That is, the flat surfaces 16, 26 can be advantageously disposed adjacent to the flat surfaces of additional sub-units. Further, when more than two sub-units are used, the inner sub-units may be formed as are those shown in FIG. 2, whereas the outer sub-units, i.e., the sub-units on the outer edges of the double-embedded optical fiber ribbon, may be formed as are those shown in FIG. 3.

Figure 4:
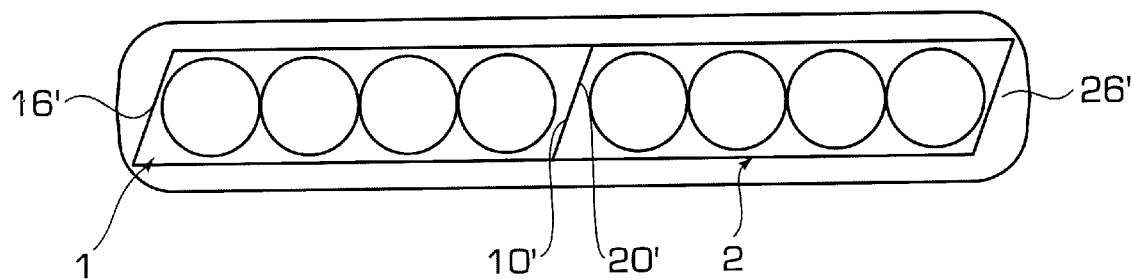
FIG. 4 is a schematic cross-section of a double-embedded optical fiber ribbon according to a second embodiment of the present invention.
Figure 5:
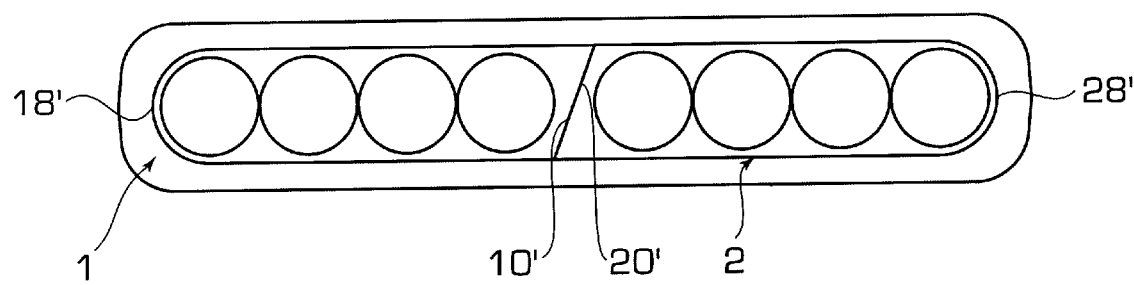
FIG. 5 is a schematic cross-section of a modified version of the sub-units in the double-embedded optical fiber ribbon according to the second embodiment of the present invention.

FIGS. 4 and 5 show a second embodiment of the present invention which will now be described. In the second embodiment, the first sub-unit ribbon 1 includes an edge having a flat surface 10' that extends between the top and bottom surface of the sub-unit. Further, the flat surface 10' is disposed oblique to the plane which contains the optical fibers 3 of the sub-unit. Similarly, the second sub-unit 2 includes a flat surface 20' that extends between the top and bottom surfaces of the sub-unit, and is disposed oblique to the plane containing that sub-unit's optical fibers 3. The sub-units are aligned so that the surface 10' opposes surface 20'.

As shown in FIG. 4, the first sub-unit ribbon 1 includes a second—outer—edge that includes a flat surface 16', whereas the second sub-unit ribbon 2 includes a second—outer—edge that includes a flat surface 26'. The flat surfaces 16', 26' extend between the top and bottom surfaces of the sub-units 1, 2, and are oblique to the plane containing the optical fibers 3. Further, the flat surfaces 16', 26' are shown as being parallel to the flat surfaces 10', 20', respectively, although they do not necessarily have to be. However, when the flat surfaces 16', 26' are parallel to the surfaces 10', 20', more than two sub-unit ribbons may be disposed adjacent one another to form a double-embedded optical fiber ribbon. As an alternative to the flat outer edges shown in FIG. 4, the outer edges of the sub-unit ribbons 1, 2 may be rounded as at 18', 28' shown in FIG. 5. The outer-edge arrangement of FIG. 5 enables the sub-unit ribbons to be encapsulated with less matrix material 5 than the outer-edge arrangement shown in FIG. 4. Further, the outer-edge arrangement of FIG. 5 has the added benefit of facilitating assembly of the double-embedded optical fiber ribbon by having only one way that the two sub-unit ribbons can be properly aligned, i.e., with their flat edges opposing or abutting one another. This arrangement also ensures—by properly placing the fibers in sequence between the flat and rounded edges during manufacture of the sub-units—that the fibers in one sub-unit are in the right sequence with respect to the fibers in the other sub-unit during assembly of the double-embedded optical fiber ribbon. Moreover, the sub-unit ribbons of FIGS. 4 and 5 may be used in combination, in the same manner as the sub-unit ribbons of the first embodiment are used, to provide a double-embedded optical fiber ribbon having more than two sub-units.

Although the surfaces 10', 20', 16', 26' are shown in FIGS. 4 and 5 as extending between the top and bottom surfaces of the sub-units 1, 2, respectively, transition regions of any shape may be used as in the first embodiment of the invention. Further, although the surfaces 10' and 20' are shown in FIGS. 4 and 5 as directly abutting one another, they may be disposed so as to face each other with matrix material 5 therebetween. However, the arrangement shown in FIGS. 4 and 5—wherein the flat surfaces 10', 20' extend between the top and bottom surfaces, as well as directly abut one another—provides an increased split-ability in the double-embedded optical fiber ribbon. Split-ability is increased because the flat surfaces 10', 20' of sub-units 1, 2 can slide against each other and create fracture points in the second matrix material 5. The fracture points allow the sub-unit ribbons to be separated with minimal difficulty and minimal residue from the second matrix material 5. The majority of the second matrix 5 will remain bonded to the surfaces of the sub-unit ribbons 1, 2, with a tear fracture along the length on each side of the sub-unit interface plane.

Figure 6:
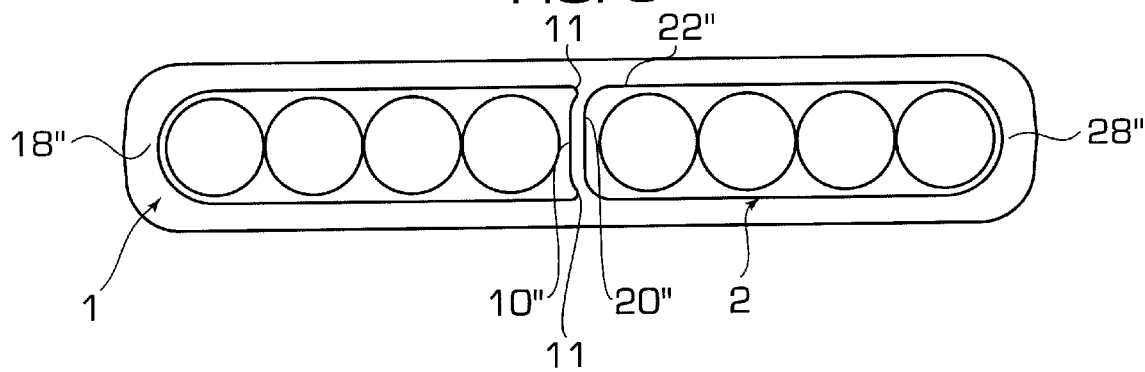
FIG. 6 is a schematic cross-section of a double-embedded optical fiber ribbon according to a third embodiment of the present invention.

FIG. 6 shows a third embodiment of the present invention which will now be described. In FIG. 6, the first sub-unit ribbon 1 includes an odd-shaped first edge having a flat surface 10" with protrusions 11 extending therefrom. The second sub-unit ribbon 2 includes a first edge having a flat surface 20" and transition regions 22" extending from the flat surface 20" to the top and bottom surfaces of the sub-unit. The surfaces 10" and 20" are disposed so as to face each other. The second—outer—edges of the sub-unit ribbons 1 and 2 include rounded edges 18" and 28", respectively. Alternatively, the outer edges of the sub-unit ribbons 1, 2 in this embodiment may also include odd-shaped ends or flat surfaces, especially if more than two sub-unit ribbons are disposed in the double-embedded optical fiber ribbon. That is, the first sub-unit may have a second edge with a flat surface 10" and protrusions 11, or may have a second edge with a flat surface 20" and transition regions 22". The important thing is that the sub-units are disposed so that complementary-shaped edges are opposed to one another. Any suitable number of sub-unit ribbons may be used. As in the previous embodiments, the sub-units may be disposed so as to have matrix material 5 therebetween, or may have their edges abut.

FIGS. 7–9 show a fourth embodiment of the present invention which will now be described. In FIG. 7, the first sub-unit ribbon 1 includes a first edge having a concave circular surface 30, and transition regions 12''' extending from the concave circular surface 30 to the top and bottom surfaces of the sub-unit ribbon 1. Alternatively, the concave circular surface 30 may extend between the top and bottom surfaces of the first sub-unit ribbon without any transition regions. Further, there may be any suitable number of concave circular surfaces 30 on the edge of the first sub-unit ribbon 1. The second sub-unit ribbon 2 includes a first edge having a convex circular surface 40. The convex circular surface 40 is complementary to the concave circular surface 30 and the sub-units are disposed so that the surfaces 30 and 40 face one another. When more than one concave circular surface 30 is present, a corresponding number of convex circular surfaces 40 is also present.

The second—outer—edges of the sub-unit ribbons 1, 2 include rounded edges 18''' and 28''' respectively. Alternatively, the outer edges of the sub-unit ribbons 1, 2 in this embodiment may also include concave or convex circular surfaces, especially if more than two sub-unit ribbons are disposed in the double-embedded optical fiber ribbon. That is, as shown in FIG. 8, the double-embedded optical fiber ribbon may include three sub-unit ribbons wherein: a first sub-unit ribbon 1 includes a first edge having a concave surface 30, and a second edge 18''' which is rounded; a second sub-unit ribbon 2 includes a first edge having a convex surface 40, and a second edge 28''' which is rounded; and a third sub-unit ribbon 1" which includes a first edge having a convex surface 40 and a second edge having a concave surface 30. Further, as shown in FIG. 9, the double-embedded optical fiber ribbon may include three sub-unit ribbons wherein: each of two second sub-unit ribbons 2 includes a first edge having a convex surface 40 and a second edge 28''' which is rounded; and a third sub-unit ribbon 1''' is disposed between the two sub-unit ribbons 2, wherein the third sub-unit ribbon 1''' includes first and second edges each having a concave surface 30. The important thing is that the sub-units are disposed so that edges having complementary-shaped surfaces 30, 40 are opposed to, or face, one another. Any number of sub-unit ribbons may be used. As in the previous embodiments, the sub-units may be disposed so as to have matrix material 5 therebetween, or may have their edges abut.

Although the sub-unit ribbons described in the above first to fourth embodiments are each shown as including four optical fibers, any number of optical fibers may be included in one sub-unit ribbon. Also, each of the sub-unit ribbons may have the same, or a different, number of optical fibers as the number of optical fibers in the other sub-unit ribbons in the double-embedded optical fiber ribbon of which they are a part. Further, although double-embedded optical fiber ribbons having only two and three sub-unit ribbons are shown in FIGS. 2–9, these embodiments may include any suitable number of sub-unit ribbons. Further, only one portion of the cross-section is shown for each embodiment. That is, the shown cross section may extend the entire length of the sub-unit, or may extend over any smaller length thereof. Further, each sub-unit ribbon in the double-embedded optical fiber ribbon may be colored. The sub-unit ribbons may have the same, or a different, color as the other sub-unit ribbons in the double-embedded optical fiber ribbon. Differently colored sub-unit ribbons are advantageous in production, especially when a two-step process is used, for identifying appropriate arrangement and orientation of the sub-unit ribbons. Differently colored sub-unit ribbons are also advantageous in ribbon inventory control during manufacturing, as well as are advantageous in the field for purposes of identification. Moreover, the double-embedded optical fiber ribbons described in the first to fourth embodiments are easily split so as to peel off, or break away, any number of the sub-unit ribbons.

The double-embedded optical fiber ribbon according to the present invention, including the first to fourth above-described embodiments, may be made by any method known to one of ordinary skill in the art. One manner of making the double-embedded optical fiber ribbon is a two-step process, wherein the sub-unit ribbons are produced first, and are then separately assembled. Alternatively, and preferably, a one-step process may be used. In the one-step process the sub-unit ribbons are produced and immediately assembled into the double-embedded optical fiber ribbon.

Figure 10:
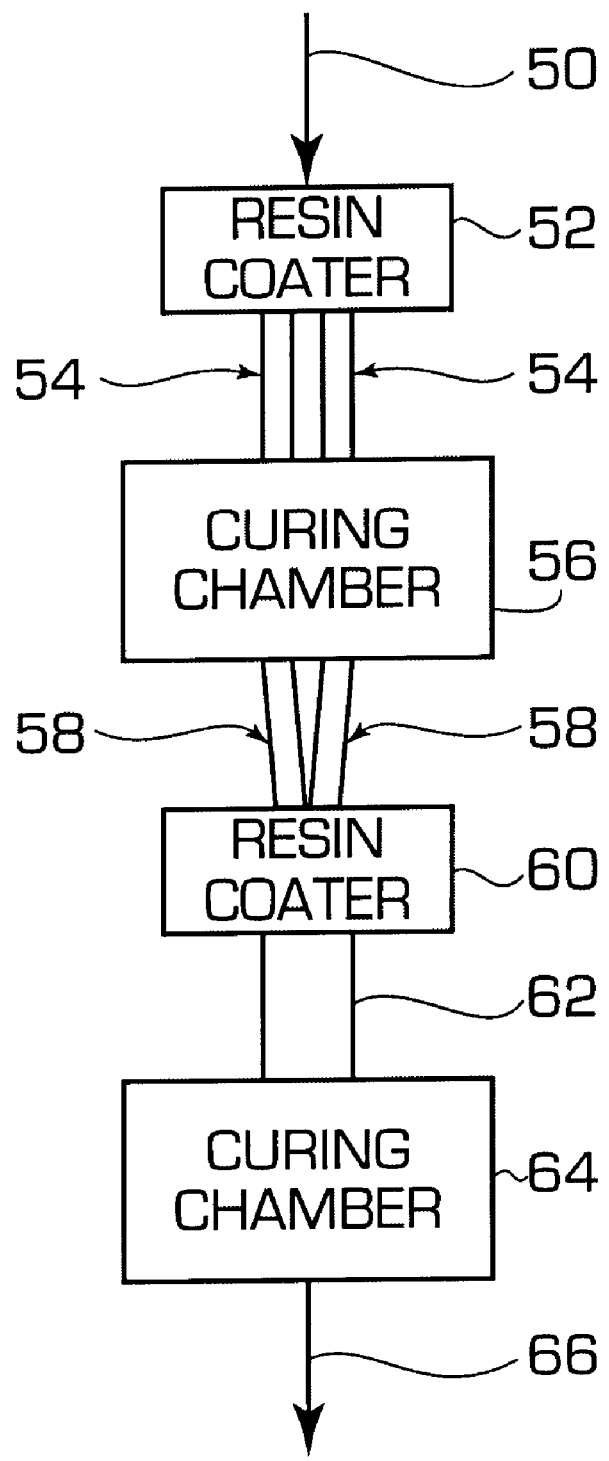
FIG. 10 is a schematic diagram of an apparatus and process for making double-embedded optical fiber ribbons of the present invention.

A one-step process will now be described with reference to FIGS. 10–12. FIG. 10 shows, schematically, an apparatus and process of making double-embedded optical fiber ribbons. A plurality of individual optical fibers are aligned as at 50, and are fed into a curable-resin coater 52. The curable-resin coater 52 applies a matrix material to groups of the individual fibers so as to form at least two sub-unit ribbons, having non-cured matrices, as at 54. The at least two sub-unit ribbons then enter curing chamber 56 wherein the matrices are cured. The at least two sub-unit ribbons are then converged toward one another so as to align the edges of the sub-unit ribbons as at 58. The aligned sub-unit ribbons are then fed into curable-resin coater 60 which applies a second matrix material, or outer encapsulation layer. The outer encapsulation layer surrounds all of the sub-unit ribbons, and exits the resin coater as at 62. The encapsulated sub-unit ribbons are then fed through a second curing chamber 64 which cures the second matrix material, or encapsulation layer. A splittable double-embedded optical fiber ribbon then exits the curing chamber as at 66 and is fed to a take-up system. The curing chambers 62 and/or 64 include, but are not limited to, any quantity or size curing lamps—such as ultraviolet, electron beams, laser, infrared light sources or a combination of the above. This ribbon process can also be performed either horizontally or vertically.

The resin coater 52 includes dies having any suitable number, and shape, of cavities. That is, the dies can have any number of cavities so as to produce any suitable number of sub-unit ribbons. Further, the die cavities can be shaped similar to each of the individual sub-unit ribbons described above in connection with FIGS. 2–9.

Figure 11A:
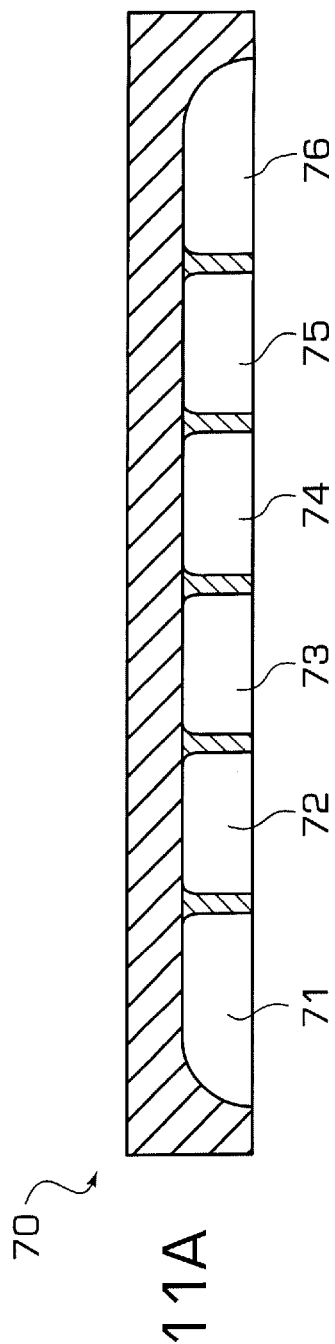
Figure 11B:
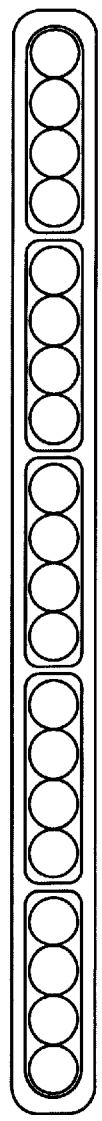
FIG. 11B is a schematic cross-section of a double-embedded optical fiber ribbon produced from the sub-units made with the die-half shown in FIG. 11A.

For example, FIG. 11A shows a die-half 70 which, in conjunction with a mating die-half (not shown), produces six sub-unit ribbons. End cavities 71 and 76 produce sub-unit ribbons similar to those of FIG. 3, whereas the interior cavities 72, 73, 74, 75 produce sub-unit ribbons similar to those of FIG. 2. A schematic cross-section of a double-embedded optical fiber ribbon produced by the die-half 70 is thus shown in FIG. 11B.

Figure 12A:
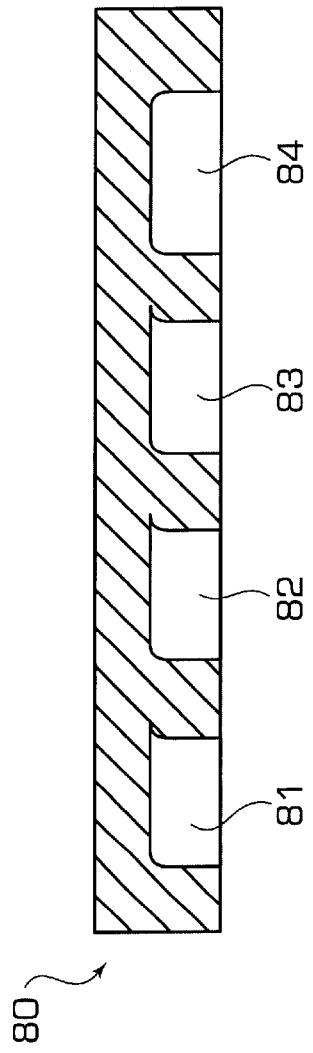
Figure 12B:
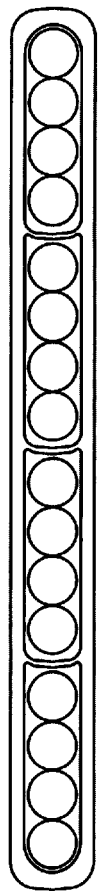
FIG. 12B is a schematic cross-section of a double-embedded optical fiber ribbon produced from the sub-units made with the die-half shown in FIG. 12A.

As another example, FIG. 12A shows a die-half 80 which, in conjunction with a mating die-half (not shown), produces four sub-unit ribbons. End cavity 81 produces a sub-unit ribbon similar to sub-unit ribbon 1 of FIG. 6, whereas end cavity 84 produces a sub-unit ribbon similar to sub-unit ribbon 2 of FIG. 6. The interior cavities 82 and 83 produce sub-unit ribbons each having a left edge with a flat surface 20" and transition regions 22", as well as having a right edge with a flat surface 10" and protrusions 11. A schematic cross-section of a double-embedded optical fiber ribbon produced by the die-half 80 is thus shown in FIG. 12B.

It is contemplated that numerous modifications may be made to the splittable optical fiber ribbons, dies, and processes, of the present invention without departing from the spirit and scope of the invention as defined in the following claims.

We claim:

1. A splittable optical fiber ribbon comprising:
    a first sub-unit ribbon having a first matrix material contacting and surrounding a first plurality of optical fibers, wherein the first matrix material includes a first edge and a second edge opposite to said first edge, wherein said first edge includes a non-circular surface; and
    a second sub-unit ribbon having the first matrix material contacting and surrounding a second plurality of optical fibers, wherein the first matrix material includes a first edge and a second edge opposite to said second sub-unit first edge, wherein said second sub-unit first edge includes a non-circular surface, wherein said non-circular surface of said second sub-unit is disposed so as to face said non-circular surface of said first sub-unit; and
    a second matrix material which surrounds and contacts the first matrix material, the second matrix material being disposed between said first and second sub-units.

2. The splittable optical fiber ribbon according to claim 1, wherein the first plurality of optical fibers in said first sub-unit are aligned in a plane extending from said first-sub-unit first edge to said first-sub-unit second edge.

3. The splittable optical fiber ribbon according to claim 2, wherein the second plurality of optical fibers in said second sub-unit are aligned in a plane extending from said second-sub-unit first edge to said second-sub-unit second edge.

4. The splittable optical fiber ribbon according to claim 3, wherein the number of optical fibers in said first sub-unit is the same as the number of optical fibers in said second sub-unit.

5. The splittable optical fiber ribbon according to claim 2, wherein said non-circular surface of said first sub-unit ribbon is substantially planar and is substantially perpendicular to the plane in which said first plurality of optical fibers of said first sub-unit are disposed.

6. The splittable optical fiber ribbon according to claim 5, wherein the second edge of said first sub-unit ribbon includes a non-circular surface.

7. The splittable optical fiber ribbon according to claim 6, wherein the non-circular surface on the second edge of said first sub-unit ribbon is substantially planar and is substantially parallel to the non-circular surface on the first edge of said first sub-unit ribbon.

8. The splittable optical fiber ribbon according to claim 2, wherein said non-circular surface of said first sub-unit ribbon is substantially planar and is oblique to the plane in which said first plurality of optical fibers of said first sub-unit are disposed.

9. The splittable optical fiber ribbon according to claim 8, wherein the second edge of said first sub-unit ribbon includes a non-circular surface.

10. The splittable optical fiber ribbon according to claim 9, wherein the non-circular surface on the second edge of said first sub-unit ribbon is substantially planar and is substantially parallel to the non-circular surface on the first edge of said first sub-unit ribbon.

11. The splittable optical fiber ribbon according to claim 8, wherein said non-circular surface of said second-sub-unit ribbon is substantially planar and abuts said non-circular surface of said first-sub-unit ribbon.

12. The splittable optical fiber ribbon according to claim 1, wherein said first edge of said first sub-unit ribbon further includes at least one protrusion extending from the non-circular surface of said first sub-unit ribbon toward said second sub-unit ribbon.

13. The splittable optical fiber ribbon according to claim 1, wherein said non-circular surface of said first sub-unit ribbon is complementary to the non-circular surface of said second sub-unit ribbon.

14. The splittable optical fiber ribbon according to claim 1, wherein the second edge of said first sub-unit ribbon is rounded.

15. The splittable optical fiber ribbon according to claim 14, wherein the second edge of said second sub-unit ribbon is rounded.

16. A splittable optical fiber ribbon comprising:
    a plurality of sub-unit ribbons, each having a first matrix material contacting and surrounding a corresponding plurality of optical fibers, wherein the first matrix material includes a first edge and a second edge opposite to said first edge, wherein at least said first edge includes a non-circular surface;
    at least two of said sub-unit ribbons having their respective non-circular surfaces opposing one another; and
    a second matrix material surrounding and contacting the first matrix material, the second matrix material being disposed between said plurality of sub-unit ribbons.

17. The splittable optical fiber ribbon according to claim 16, wherein the corresponding plurality of optical fibers in each of said plurality of sub-unit ribbons are aligned in a plane extending from said first edge to said second edge.

18. The splittable optical fiber ribbon according to claim 17, wherein the number of optical fibers in each of said plurality of sub-unit ribbons is the same.

19. The splittable optical fiber ribbon according to claim 16, wherein said plurality of sub-unit ribbons includes at least three sub-unit ribbons aligned edge-to-edge so as to include two end sub-unit ribbons and at least one middle sub-unit ribbon, and wherein said at least one middle sub-unit ribbon includes a non-circular surface on each of its first and second edges.

20. The splittable optical fiber ribbon according to claim 19, wherein at least one of said two end sub-unit ribbons includes a non-circular surface on its first and second edges.

21. The splittable optical fiber ribbon according to claim 19, wherein at least one of said two end sub-unit ribbons includes a rounded surface on its second edge.

22. The splittable optical fiber ribbon according to claim 16, wherein said at least two sub-unit ribbons having non-circular surfaces opposing one another are disposed so that their non-circular surfaces abut one another.

23. A splittable optical fiber ribbon comprising:
   a first sub-unit ribbon having a first matrix material contacting and surrounding a first plurality of optical fibers, wherein the first matrix material includes a first edge and a second edge opposite to said first edge, wherein said first edge includes a concave circular surface;
   a second sub-unit ribbon having the first matrix material contacting and surrounding a second plurality of optical fibers, wherein the first matrix material includes a first edge and a second edge opposite to said first edge, wherein said first edge includes a convex circular surface;
   wherein said convex circular surface of said second sub-unit ribbon is disposed complementarily adjacent to said concave circular surface of said first sub-unit ribbon, and a second matrix material surrounds and contacts the first matrix material of said first and second sub-unit ribbons.

24. The splittable optical fiber ribbon according to claim 23, wherein the first plurality of optical fibers of said first sub-unit ribbon are aligned in a plane extending from said first-sub-unit first edge to said first-sub-unit second edge.

25. The splittable optical fiber ribbon according to claim 24, wherein the second plurality of optical fibers of said second sub-unit ribbon are aligned in a plane extending from said second-sub-unit first edge to said second-sub-unit second edge.

26. The splittable optical fiber ribbon according to claim 25, wherein the number of optical fibers in said first sub-unit ribbon is the same as the number of optical fibers in said second sub-unit ribbon.

27. A die for producing a plurality of sub-unit ribbons, the die comprising:
   a plurality of cavities, wherein at least two adjacent cavities include complimentarily-shaped non-circular adjacent edges.

28. A method of making a double-embedded optical fiber ribbon comprising:
   forming a plurality of sub-unit ribbons each having a first matrix material contacting a corresponding plurality of optical fibers, wherein the first matrix material of each sub-unit ribbon includes a first edge and a second edge opposite to said first edge, wherein at least said first edge includes a non-circular surface;
   aligning at least two of said sub-unit ribbons so that their respective non-circular surfaces are opposing one another;
   disposing a second matrix material around and in contact with the first matrix material of said plurality of sub-unit ribbons to encapsulate said plurality of sub-unit ribbons; and
   curing said second matrix material.

* * * * *